Patented Mar. 9, 1948

2,437,504

UNITED STATES PATENT OFFICE 2,437,504

THIAMIN DIOCTYLSULFOSUCCINATE

John B. Conn, Scotch Plains, N. J., assignor to Merck & Co., Inc., Rahway, N. J., a corporation of New Jersey No Drawing. Application March 8, 1946, Serial No. 653,157

7 Claims. (Cl. 260—251)

This invention relates to a new and improved process for the preparation of a novel, biologically active, form of vitamin $B_1$ which is preferentially soluble in organic solvents, and to the new chemical compound thereby produced.

My invention is more particularly directed to a new form of vitamin $B_1$ compound which is soluble in organic solvents. In this respect it differs from the normally hydrophilic thiamin preparations which, while soluble in aqueous liquids and some polar solvents, are insoluble in nonpolar solvents such as oils.

My invention is therefore concerned with a new thiamin chemical compound which possesses the biological activity of vitamin $B_1$, differing from the usual vitamin $B_1$ preparations, such as the chloride hydrochloride, bromide hydrobromide, or sulfate, in that it is soluble in oils. My invention also relates to the new and improved method by which the new form of vitamin may be prepared.

Vitamin $B_1$ in the form of its chloride hydrochloride, i. e. thiamin chloride hydrochloride, has the following structure:

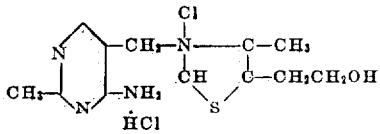

Its empirical formula is $C_{12}H_{18}ON_4SCl_2$. In the bromide hydrobromide thiamin salt, bromine replaces chlorine in the structural formula given. These usual forms in which the vitamin $B_1$ is prepared are generally insoluble in nonpolar solvents such as oils.

It is the principal object of my invention to render the vitamin preferentially soluble in organic solvents, which is accomplished, in accordance with my invention, by coupling it with organic sulfosuccinate ions to prepare a new salt of thiamin. In this way I prepare a biologically-active form of vitamin $B_1$ which possesses solubility, at least to a moderate degree, in oils such as cottonseed oil, peanut oil, olive oil and cod liver oils. This new form of vitamin $B_1$ is highly soluble in alcohol, ether, acetone, chloroform, benzene, petroleum ether, ethyl oleate, and other solvents, and may be used to produce syrupy solutions or concentrates with these solvents.

In converting the normal hydrophilic form of vitamin $B_1$, such as thiamin chloride hydrochloride, thiamin bromide hydrobromide, or thiamin sulfate, to a form in which it is preferentially soluble in organic solvents, the thiamin molecule is coupled with an organic sulfosuccinate compound, such as dioctylsulfosuccinate, to produce a new chemical compound, thiamin dioctylsulfosuccinate. Coupling the vitamin $B_1$ molecule with an ester salt of sulfosuccinic acid results in imparting the characteristic of considerable oil solubility to the new chemical compound resulting. Bioassays for thiamin activity carried out by the rat curative technique established that thiamin dioctylsulfosuccinate has approximately 60% the vitamin $B_1$ activity of thiamin chloride hydrochloride. It is therefore valuable as a highly active form of vitamin $B_1$.

In preparing thiamin dioctylsulfosuccinate, a thiamin salt, such as thiamin chloride hydrochloride, thiamin bromide hydrobromide, or thiamin sulfate, is reacted with a suitable ester salt, such as an alkali metal salt of dioctylsulfosuccinate. This results in a white precipitate, thiamin dioctylsulfosuccinate, which may be recovered in the form of a colorless resin which slowly becomes crystalline.

Various salts of dioctylsulfosuccinic acid may be utilized in the reaction. Generally I prefer to use the alkali metal salts of this acid, because of their water solubility. When sodium dioctylsulfosuccinate is reacted with an aqueous solution of a thiamin salt, such as thiamin chloride hydrochloride, or thiamin bromide hydrobromide, the reaction occurs as follows:

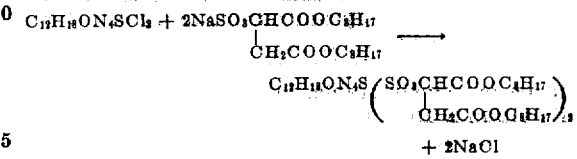

The reaction takes place in the same way when thiamin bromide hydrobromide is utilized as the thiamin salt, bromine replacing chlorine in the above equation.

My improved process for rendering water-soluble salts of thiamin more soluble in nonpolar organic solvents, such as oils, by reacting the thiamin salt with a water-soluble salt of an organic sulfonic acid, especially an organic sulfonic acid having surface-active properties, and the new chemical compound possessing vitamin $B_1$ activity obtained thereby, are illustrated by the following examples. These examples are to be regarded as illustrative and not necessarily restrictive.

*Example 1*

44 grams (0.10 mole) of sodium dioctylsulfosuccinate was dissolved in one liter of water, the temperature being raised in order to facilitate solution. The solution was then cooled to room temperature and 17 grams (0.05 mole) of thiamin chloride hydrochloride added thereto. Upon agitation a curdy white precipitate of thiamin dioctylsulfosuccinate was formed. The mixture was allowed to settle and the greater part of the supernatant liquor decanted.

The new chemical compound, thiamin dioctylsulfosuccinate, was found to be only slightly soluble in water, although readily dispersed therein to form a colloidal suspension. It is extremely soluble in alcohol, ether, acetone, chloroform, benzene, petroleum ether, and ethyl oleate, and moderately soluble (solubility 5 to 10%) in cottonseed oil, peanut oil and cod liver oil. Strong solutions may be prepared by first dissolving the compound to a syrupy concentration in ethyl oleate, and then adding this concentrate to the oil. Saturated aqueous solutions of the compound possess detergent properties similar to those of sodium dioctylsulfosuccinate. In the nonpolar solvents in which it is extremely soluble, it may be incorporated in sufficient amount therein to produce syrupy solutions.

200 milliliters of acid-free ether were then added to the slurry of thiamin dioctylsulfosuccinate, thus dissolving the compound. The ether layer was separated, dried by the addition of anhydrous calcium sulfate, filtered, and concentrated under reduced pressure less than atmospheric, first at room temperature, and finally at an elevated temperature within the range 80–100° C. The resulting product, substantially pure thiamin dioctylsulfosuccinate, was recovered in the form of a sticky colorless resin which slowly became crystalline, yielding a mass of soft waxy needles melting at 65–68° C. The yield was 50 grams or 90% of theory. Thiochrome assay values established that the product was thiamin dioctylsulfosuccinate having the empirical formula $C_{12}H_{18}ON_4S(C_{20}H_{37}O_7S)_2$.

*Example 2*

50 grams (0.12 mole) of thiamin bromide hydrobromide and 105 grams (0.24 mole) of sodium dioctylsulfosuccinate were reacted in aqueous solution in accordance with the procedure described in Example 1. The product was thiamin dioctylsulfosuccinate in the form of soft waxy needles melting at 65–68° C.

Thiamin dioctylsulfosuccinate has been found to be extremely stable, losing less than 10% of its vitamin $B_1$ potency when stored in edible oil solutions for a period of one month at room temperature. Its toxicity is low, the L. D. 50 being in excess of 2 grams per kilogram for mice.

Tests on rats fed on a diet deficient in vitamin $B_1$ clearly established its biological activity, approximately 60% of that of thiamin chloride hydrochloride, when administered to the rats in oil solution.

Various changes and modifications might be made in my invention as defined herein without departing from the scope thereof. It is my intention that these changes and modifications, to the extent that they are comprehended within the scope of the appended claims, shall be considered as part of my invention.

I claim:

1. The method of rendering vitamin $B_1$ preparations soluble in oils and other nonpolar solvents which comprises coupling a water-soluble salt of thiamin with a salt of dioctylsulfosuccinic acid.

2. The method of rendering vitamin $B_1$ preparations soluble in oils and other nonpolar solvents which comprises coupling a water-soluble salt of thiamin selected from the group which consists of thiamin chloride hydrochloride, thiamin bromide hydrobromide, and thiamin sulfate with an alkali metal salt of dioctylsulfosuccinic acid.

3. The process of rendering vitamin $B_1$ preparations soluble in nonpolar solvents which comprises reacting thiamin chloride hydrochloride with an alkali metal salt of dioctylsulfosuccinic acid.

4. The process of rendering vitamin $B_1$ preparations soluble in nonpolar solvents which comprises reacting thiamin bromide hydrobromide with an alkali metal salt of dioctylsulfosuccinic acid.

5. The process of rendering vitamin $B_1$ preparations soluble in nonpolar solvents which comprises reacting thiamin sulfate with an alkali metal salt of dioctylsulfosuccinic acid.

6. The process of preparing thiamin dioctylsulfosuccinate which comprises reacting a thiamin salt selected from the group which consists of thiamin chloride hydrochloride, thiamin bromide hydrobromide, and thiamin sulfate with sodium dioctylsulfosuccinate.

7. Thiamin dioctylsulfosuccinate.

JOHN B. CONN.

REFERENCES CITED

The following references are of record in the file of this patent:

UNITED STATES PATENTS

| Number | Name | Date |
|---|---|---|
| 1,861,543 | Moore | June 7, 1932 |
| 2,409,671 | Faust | Oct. 22, 1946 |